US008971438B2

(12) United States Patent
Baik et al.

(10) Patent No.: US 8,971,438 B2
(45) Date of Patent: Mar. 3, 2015

(54) METHODS AND APPARATUS FOR SIMPLIFIED BEAMFORMING

(71) Applicant: QUALCOMM Incorporated, San Diego, CA (US)

(72) Inventors: Eugene Jong-Hyon Baik, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/930,784

(22) Filed: Jun. 28, 2013

(65) Prior Publication Data

US 2014/0010319 A1 Jan. 9, 2014

Related U.S. Application Data

(60) Provisional application No. 61/669,605, filed on Jul. 9, 2012.

(51) Int. Cl.
*H04L 27/00* (2006.01)
*H04B 7/04* (2006.01)
*H04B 7/06* (2006.01)

(52) U.S. Cl.
CPC ............ *H04B 7/0413* (2013.01); *H04B 7/0619* (2013.01); *H04B 7/0617* (2013.01)
USPC ........... 375/267; 375/260; 375/295; 375/316; 375/329; 375/299

(58) Field of Classification Search
CPC .. H04B 7/0634; H04B 7/0682; H04B 7/0617; H04B 7/061; H04B 7/0632; H04B 7/0658; H04B 7/0408; H04B 7/0691; H04B 17/0007; H04B 7/0619; H04B 17/0067; H04W 16/28
USPC .......... 375/260, 262, 265, 267; 370/203, 204, 370/205, 208, 209
See application file for complete search history.

(56) References Cited

U.S. PATENT DOCUMENTS

| 6,134,261 | A | 10/2000 | Ryan |
| 6,892,059 | B1 | 5/2005 | Kim et al. |
| 8,412,275 | B2 | 4/2013 | Kim et al. |
| 8,665,906 | B1 * | 3/2014 | Liu et al. ........................ 370/473 |

(Continued)

FOREIGN PATENT DOCUMENTS

| EP | 0940934 A2 | 9/1999 |
| WO | 2012100856 A1 | 8/2012 |

OTHER PUBLICATIONS

International Search Report and Written Opinion—PCT/US2013/048896—ISA/EPO—Dec. 6, 2013.

(Continued)

*Primary Examiner* — Dhaval Patel
(74) *Attorney, Agent, or Firm* — Knobbe Martens Olson & Bear LLP

(57) ABSTRACT

Systems, methods, and devices for simplified beamforming are provided. In one aspect, a plurality of signals from a signal transmitter are received over a wireless network on one or more receive antennas. One or more phase differences are then determined that maximize a signal to noise ratio of the plurality of received signals. Data representing the one or more phase differences is then transmitted to the signal transmitter.

28 Claims, 8 Drawing Sheets

(56) References Cited

U.S. PATENT DOCUMENTS

2011/0085587 A1 4/2011 Moulsley et al.
2011/0194637 A1 8/2011 Jiang et al.
2011/0195734 A1 8/2011 Jiang et al.
2013/0285944 A1* 10/2013 Wang et al. ................... 345/173

OTHER PUBLICATIONS

QUALCOMM Incorporated: "On the benefits of Uplink Closed Loop Transmit Diversity", 3GPP Draft; R1-104737_On the Benefits of UL CLTD, 3rd Generation Partnership Project (3GPP), Mobile Competence Centre; 650, Route Des Lucioles; F-06921 Sophia-Antipolis Cedex ; France, vol. RAN WGI, no. Madrid, Spain; 20100823, Aug. 17, 2010, 17 pages; XP050449978, [retrieved on Aug. 17, 2010].

Philips, "Reuse of Release 8 codebook design for Release 10 DL MIMO UE feedback," Discussion, R1-101289, 3GPP TSG RAN WG1 Meeting #60, San Francisco, USA, Feb. 22-26, 2010, 6 Pages.

* cited by examiner

METHODS AND APPARATUS FOR SIMPLIFIED BEAMFORMING

CROSS REFERENCE TO RELATED APPLICATIONS

This application claims the benefit of U.S. Provisional Application 61/669,605, filed Jul. 9, 2012, and entitled "METHODS AND APPARATUS FOR SIMPLIFIED BEAMFORMING," and assigned to the assignee hereof. The disclosure of this prior application is considered part of this application, and is hereby incorporated by reference in its entirety.

FIELD

Certain aspects of the present disclosure generally relate to wireless communications, and more particularly, to methods and apparatus for simplified beamforming.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output (SISO), multiple-input-single-output (MISO), single-input-multiple-output (SIMO), or a multiple-input-multiple output (MIMO) system.

Additionally, in wireless communications systems, spectrum bandwidth and base station transmit power may be regulated. To design around such constraints, multiple-input multiple-output (MIMO) systems may provide an increased peak data rate, spectral efficiency, and quality of service. A MIMO system consists of transmitter(s) and receiver(s) equipped, respectively, with multiple ($N_T$) transmit antennas and multiple ($N_R$) receive antennas for data transmission. A variant of a MIMO system that still presents gains compared to single-input single-output (SISO) systems is a single-input multiple-output (SIMO) system. A MIMO channel formed by the $N_T$ transmit and $N_R$ receive antennas may be decomposed into $N_V$ independent channels, which are also referred to as spatial eigenchannels, where $1 \le N_V \le \min\{N_T, N_R\}$.

MIMO systems can provide improved performance (e.g. higher throughput, greater capacity, or improved reliability, or any combination thereof) if the additional dimensionalities created by the multiple transmit and receive antennas are utilized. It should be appreciated that although SIMO systems afford a somewhat lesser improvement in performance, such systems avoid complexity at the receiver, by employing only a single antenna in the user equipment and relying on multiple antennas at base stations.

The devices in a wireless network may transmit/receive information between each other via wireless signals. Communication systems experience channel fading or other interference. This interference may make it more difficult to decode received signals. Devices may have a need for preventing interference between wireless signals transmitted at different frequencies to reduce interference within the system and increase the bandwidth over which signals may be transmitted.

One method to mitigate challenges associated with channel interference is with the use of beamforming. With beamforming, each transmit antenna of a transmitter is not operated independently to form a spatial stream. Instead, the transmit antennas transmit a linear combination of spatial streams, with the combination chosen so as to optimize the response at an intended receiver.

Smart antennas are arrays of antenna elements, each of which transmit a signal with a predetermined phase offset and relative gain. The net effect of the array is to direct a transmission beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area as conventional antennas typically do. Smart antennas increase system capacity by decreasing the width of the beam directed at each mobile unit and thereby decreasing interference between mobile units. Such reductions in interference result in increases in signal to interference and signal to noise ratios that improve performance and/or capacity. In power controlled systems, directing narrow beam signals at each mobile unit also results in a reduction in the transmit power required to provide a given level of performance.

While utilization of beamforming may improve performance in some dimensions, the implementation of beamforming has associated costs. For example, beamforming of a plurality of transmit antennas may rely on statistical information generated by a receiver. Generation of the beamforming information, or a "beamforming report," may impose burdens on the receiver in terms of computational processing requirements and power consumption. Therefore, improved methods and apparatus for performing beamforming are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

In one aspect, a method of providing simplified beamforming data to a signal transmitter is disclosed. The method includes receiving a plurality of signals from a signal transmitter over a wireless network on one or more receive antennas, determining a phase difference based on the plurality of signals, and transmitting data representing the phase difference to the signal transmitter.

Another innovative aspect is an apparatus for providing simplified beamforming data to a signal transmitter. The apparatus includes a receiver configured to receive a plurality of signals from a signal transmitter over a wireless network on one or more receive antennas, a processor configured to determine a phase difference based on the plurality of signals, and a transmitter configured to transmit data representing the phase difference to the signal transmitter.

Another innovative aspect is an apparatus for providing simplified beamforming data to a signal transmitter. The apparatus includes a means for receiving a plurality of signals from a signal transmitter over a wireless network on one or more receive antennas, a means for determining a phase difference based on the plurality of signals, and a means for transmitting data representing the phase difference to the signal transmitter.

Another innovative aspect is a non-transitory computer readable medium comprising instructions that when executed cause a processor to perform a method of receiving a plurality of signals from a signal transmitter over a wireless network on one or more receive antennas, determining a phase difference based on the plurality of signals, and transmitting data representing the phase difference to the signal transmitter.

Another innovative aspect is a method of beamforming a wireless transmission including a plurality of signals generated by a plurality of transmit antennas, each signal in the plurality of signals generated by a different transmission antenna. The method includes transmitting a plurality of signals to a station over a wireless network using the plurality of transmit antennas, receiving beamforming data representing a first phase difference from the station, and transmitting second data to the station on the plurality of transmit antennas, wherein the transmission of second data on a portion of the plurality of antennas is adjusted based on the first phase difference.

Another innovative aspect is an apparatus for beamforming a wireless transmission including a plurality of signals generated by a plurality of transmit antennas, each signal in the plurality of signals generated by a different transmission antenna. The apparatus includes a transmitter configured to transmit a plurality of signals to a station over a wireless network using the plurality of transmit antennas, a receiver configured to receive beamforming data representing a first phase difference from the station, and a transmitter configured to transmit second data to the station on the plurality of transmit antennas, wherein the transmission of second data on a portion of the plurality of antennas is adjusted based on the first phase difference.

Another innovative aspect is an apparatus for beamforming a wireless transmission including a plurality of signals generated by a plurality of transmit antennas, each signal in the plurality of signals generated by a different transmission antenna. The apparatus includes a means for transmitting a plurality of signals to a station over a wireless network using the plurality of transmit antennas, a means for receiving beamforming data representing a first phase difference from the station, and a means for transmitting second data to the station on the plurality of transmit antennas, wherein the transmission of second data on a portion of the plurality of antennas is adjusted based on the first phase difference.

Another innovative aspect is a non-transitory, computer readable medium comprising instructions that when executed cause a processor to perform a method of transmitting a plurality of signals to a station over a wireless network using the plurality of transmit antennas, receiving beamforming data representing a first phase difference from the station, and transmitting second data to the station on the plurality of transmit antennas, wherein the transmission of second data on a portion of the plurality of antennas is adjusted based on the first phase difference.

Another aspect, disclosed is a method of providing simplified beamforming data to a signal transmitter. The method includes receiving a plurality of signals that have been transmitted from at least two antennas of a signal transmitter over a wireless network, determining first phase differences that maximize a signal to noise ratio of the plurality of received signals, and transmitting data representing the first phase differences to the signal transmitter. In some aspects, each of the first phase differences are selected from zero (0) and $\pi$. In some aspects, each of the first phase differences are selected from zero (0), $\pi/2$, $\pi$, and $3\pi/2$. In some aspects, the method further includes transmitting a beamforming report to the signal transmitter, wherein the beamforming report indicates a format of sounding feedback included in the report. In some of these aspects, the beamforming report indicates a simplified beamforming report. In some aspects, the simplified beamforming report does not include amplitude information. In some aspects, the simplified beamforming report includes only phase difference information. In some aspects, the plurality of signals are received on one receive antenna. In some aspects, the signal transmitter is an access point.

Another aspect disclosed is an apparatus for providing simplified beamforming data to a signal transmitter. The apparatus includes a receiver configured to receive a plurality of signals that have been transmitted from at least two antennas of a signal transmitter over a wireless network, a processor configured to determine first phase differences that maximize a signal to noise ratio of the plurality of received signals, and a transmitter configured to transmit data representing the first phase differences to the signal transmitter. In some aspects, the processor is further configured to select each of the first phase differences from zero (0) and $\pi$. In some aspects, the processor is further configured to select each of the first phase differences from zero (0), $\pi/2$, $\pi$, and $3\pi/2$. In some aspects, the apparatus also includes a transmitter configured to transmit a beamforming report to the signal transmitter, wherein the beamforming report indicates a format of sounding feedback included in the report. In some aspects, the beamforming report indicates a simplified beamforming report. In some aspects, the transmitter is configured to transmit a simplified beamforming report that does not include amplitude information. In some aspects, the transmitter is configured to transmit a simplified beamforming report that includes only phase difference information.

Another aspect disclosed is an apparatus for providing simplified beamforming data to a signal transmitter. The apparatus includes means for receiving a plurality of signals that have been transmitted from at least two antennas of a signal transmitter over a wireless network, means for determining first phase differences that maximize a signal to noise ratio of the plurality of received signals, and means for transmitting data representing the first phase differences to the signal transmitter. In some aspects, the means for determining is configured to select each of the first phase differences from zero (0) and π. In some aspects, the means for determining is configured to select each of the first phase differences from zero (0), π/2, π, and 3π/2. In some aspects, the apparatus also includes a means for transmitting a beamforming report to the signal transmitter, wherein the beamforming report indicates a format of sounding feedback included in the report. In some aspects, the beamforming report indicates a simplified beamforming report. In some aspects, the means for transmitting is configured to transmit a simplified beamforming report that does not include amplitude information. In some aspects, the means for transmitting is configured to transmit a simplified beamforming report that includes only phase difference information.

Another aspect disclosed is a non-transitory computer readable medium comprising instructions that when executed cause a processor to perform a method. The method includes receiving a plurality of signals that have been transmitted from at least two antennas of a signal transmitter over a wireless network, determining first phase differences that maximize a signal to noise ratio of the plurality of received signals, and transmitting data representing the first phase differences to the signal transmitter. In some aspects, each of the first phase differences are selected from zero (0) and π. In some aspects, each of the first phase differences are selected from zero (0), π/2, π, and 3π/2. In some aspects, the method further includes transmitting a beamforming report to the signal transmitter, wherein the beamforming report indicates a format of sounding feedback included in the report. In some of these aspects, the beamforming report indicates a simplified beamforming report. In some aspects, the simplified beamforming report does not include amplitude information. In some aspects, the simplified beamforming report includes only phase difference information. In some aspects, the plurality of signals are received on one receive antenna. In some aspects, the signal transmitter is an access point.

Another aspect disclosed is a method of providing simplified beamforming data to a signal transmitter. The method includes receiving a plurality of signals that have been transmitted from at least two antenna of a signal transmitter over a wireless network, determining one or more phase differences that maximize a signal to noise ratio of the plurality of received signals, and transmitting data representing the one or more phase differences to the signal transmitter. In some aspects, each of the phase differences are selected from zero (0) and π. In some aspects, each of the phase differences are selected from zero (0), π/2, π, and 3π/2. In some aspects, the method also includes transmitting a beamforming report to the signal transmitter, wherein the beamforming report indicates a format of sounding feedback included in the report. In some of these aspects, the beamforming report indicates a simplified beamforming report. In some of these aspects, the simplified beamforming report does not include amplitude information. In some of these aspects, the simplified beamforming report includes only phase difference information. In some aspects, the plurality of signals are received on one receive antenna. In some aspects, the signal transmitter is an access point.

Another aspect disclosed is an apparatus for providing simplified beamforming data to a signal transmitter. The apparatus includes a receiver configured to receive a plurality of signals transmitted from at least two antennas of a signal transmitter over a wireless network, a processor configured to determine one or more phase differences that maximize a signal to noise ratio of the plurality of received signals, and a transmitter configured to transmit data representing the one or more phase differences to the signal transmitter. In some aspects, the processor is further configured to select each of the phase differences from zero (0) and π. In some aspects, the processor is further configured to select each of the phase differences from zero (0), π/2, π, and 3π/2. In some aspects, the apparatus also includes a transmitter configured to transmit a beamforming report to the signal transmitter, wherein the beamforming report indicates a format of sounding feedback included in the report. In some aspects, the beamforming report indicates a simplified beamforming report. In some aspects, the transmitter is configured to transmit a simplified beamforming report that does not include amplitude information. In some aspects, the transmitter is configured to transmit a simplified beamforming report that includes only phase difference information.

Another aspect disclosed is an apparatus for providing simplified beamforming data to a signal transmitter. The apparatus includes means for receiving a plurality of signals that have been transmitted from at least two antennas of a signal transmitter over a wireless network, means for determining one or more phase differences that maximize a signal to noise ratio of the plurality of received signals, and means for transmitting data representing the one or more phase differences to the signal transmitter. In some aspects, the means for determining is configured to select each of the phase differences from zero (0) and π. In some aspects, the means for determining is configured to select each of the phase differences from zero (0), π/2, π, and 3π/2. In some aspects, the apparatus also includes a means for transmitting a beamforming report to the signal transmitter, wherein the beamforming report indicates a format of sounding feedback included in the report. In some aspects, the beamforming report indicates a simplified beamforming report. In some aspects, the means for transmitting is configured to transmit a simplified beamforming report that does not include amplitude information. In some aspects, the means for transmitting is configured to transmit a simplified beamforming report that includes only phase difference information.

Another aspect disclosed is a non-transitory computer readable medium comprising instructions that when executed cause a processor to perform a method. The method includes receiving a plurality of signals that have been transmitted from at least two antennas of a signal transmitter over a wireless network, determining one or more phase differences that maximize a signal to noise ratio of the plurality of received signals, and transmitting data representing the one or more phase differences to the signal transmitter. In some aspects, each of the phase differences are selected from zero (0) and π. In some aspects, each of the phase differences are selected from zero (0), π/2, π, and 3π/2. In some aspects, the method also includes transmitting a beamforming report to the signal transmitter, wherein the beamforming report indicates a format of sounding feedback included in the report. In some aspects, the beamforming report indicates a simplified beamforming report. In some of these aspects, the simplified beamforming report does not include amplitude information. In some aspects, the simplified beamforming report includes only phase difference information.

DETAILED DESCRIPTION

Figure 1:
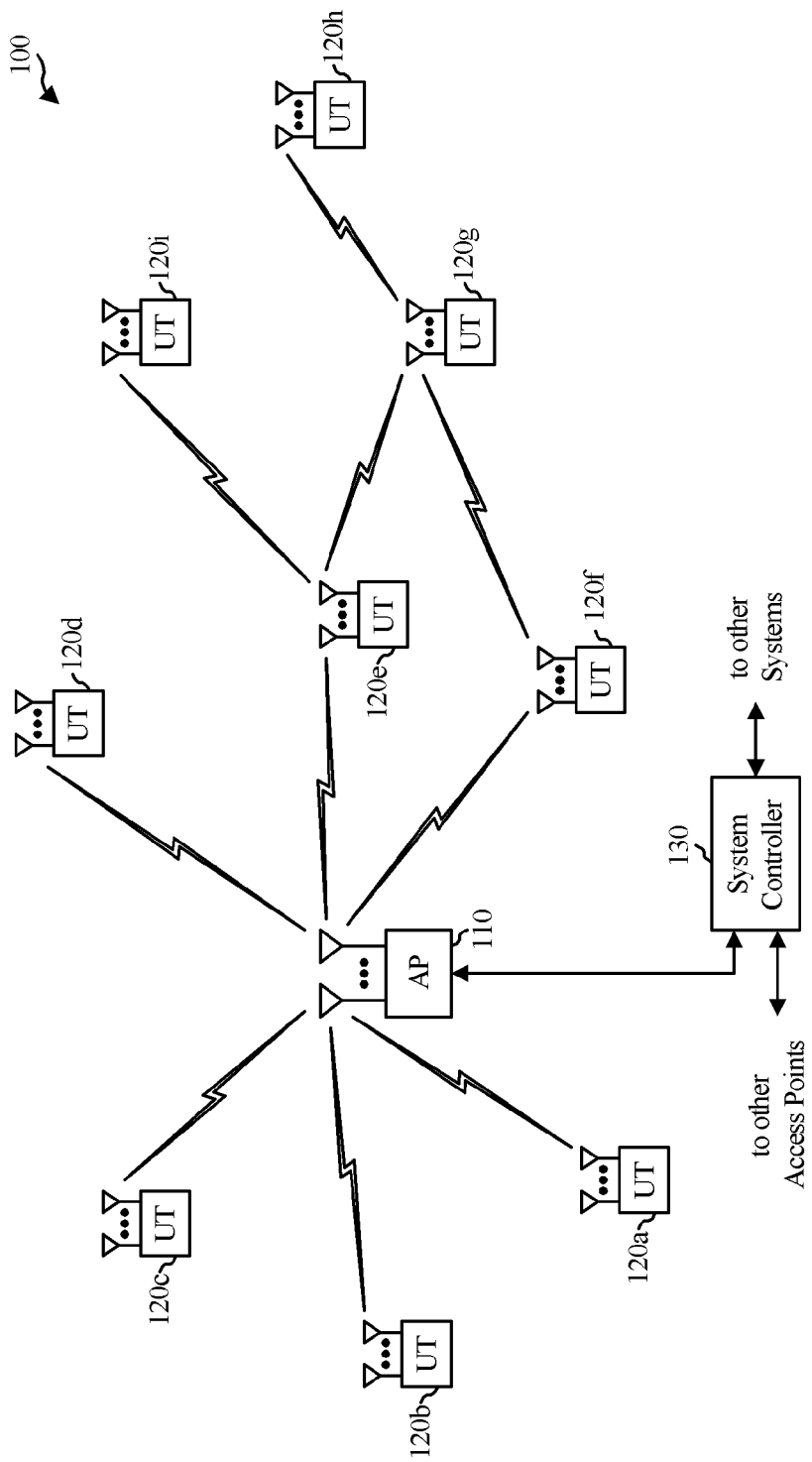
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
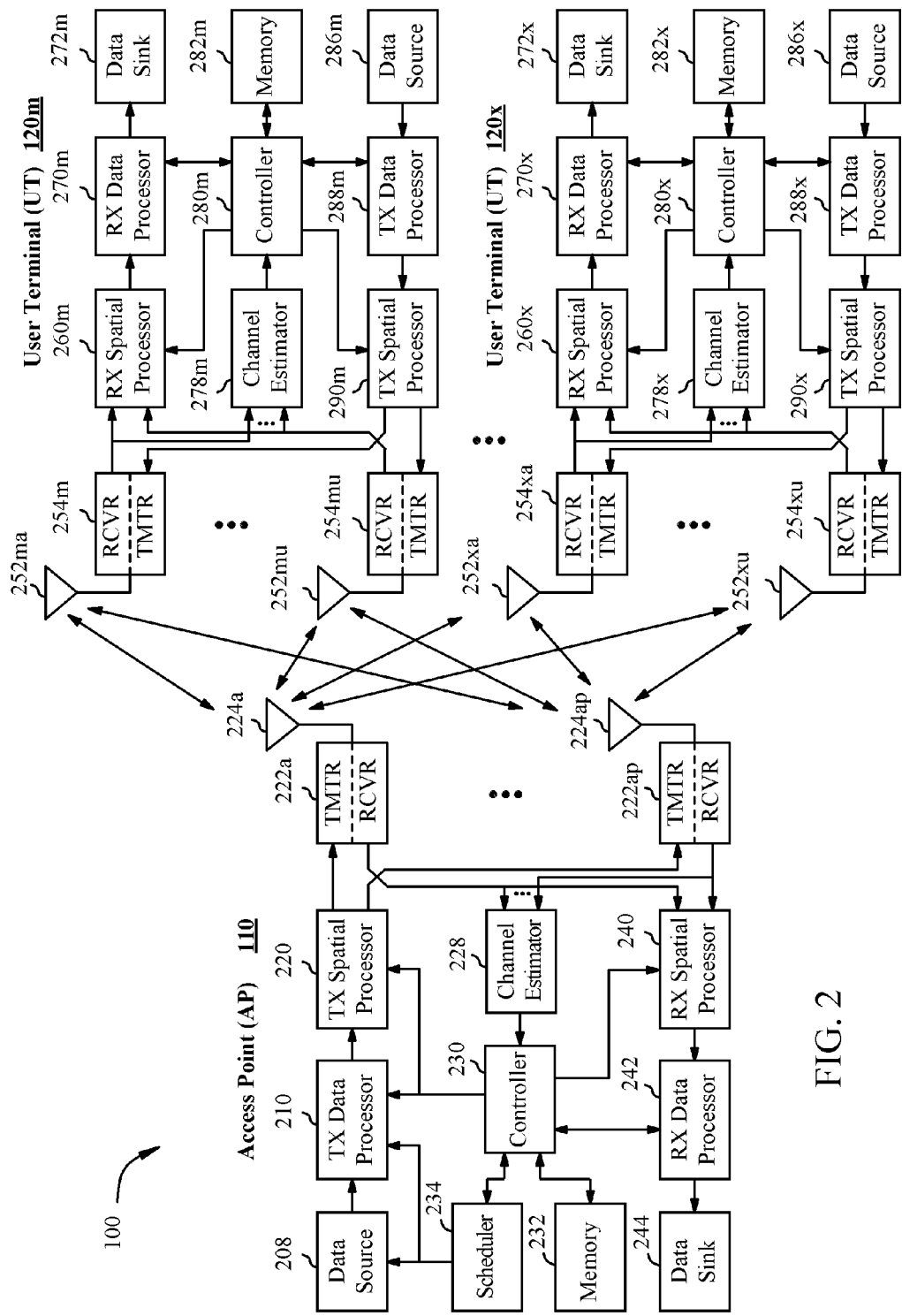
FIG. 2 illustrates a block diagram of the access point 110 and two user terminals 120m and 120x in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
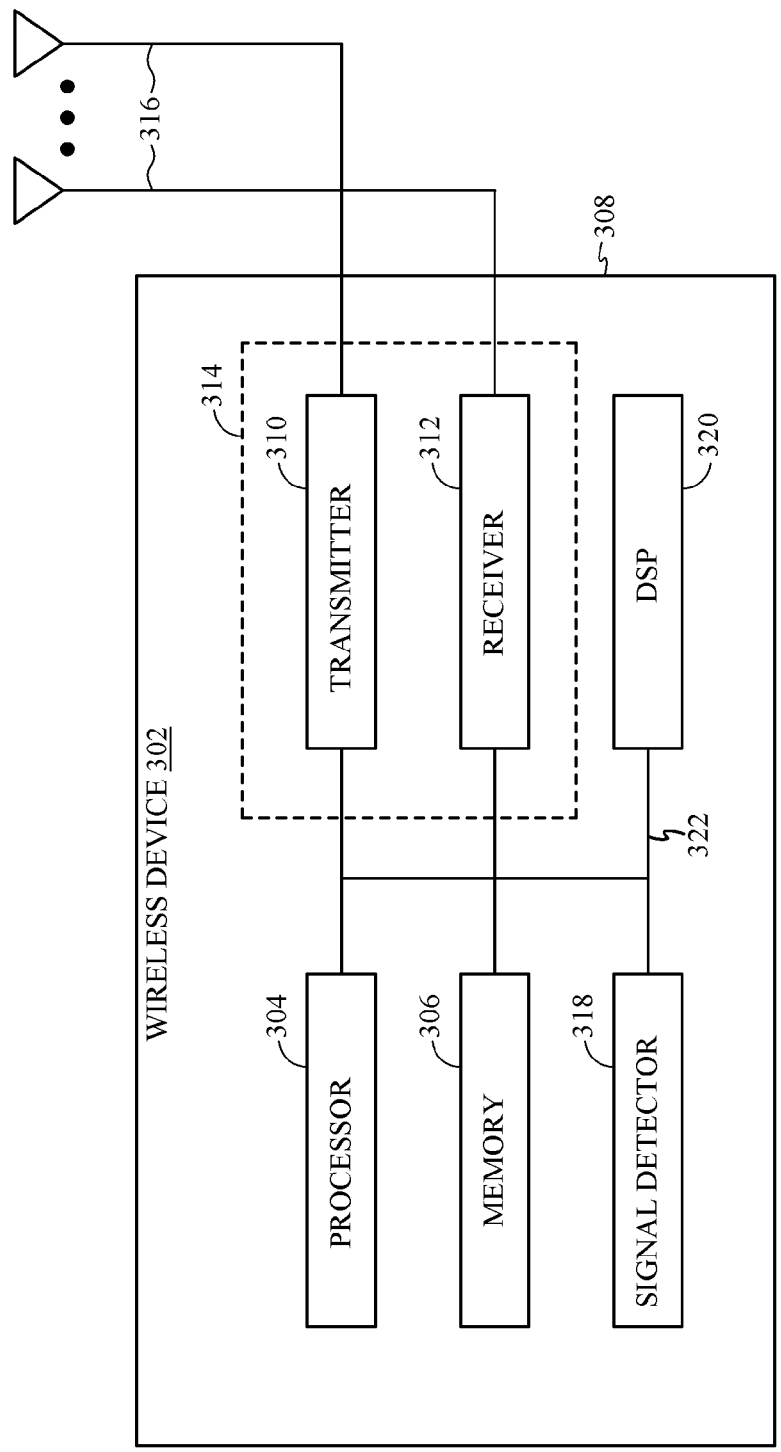
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, the wireless system 100 illustrated in FIG. 1 operates in accordance with IEEE 802.11ac wireless communications standard. The IEEE 802.11ac represents an IEEE 802.11 amendment that allows for higher throughput in IEEE 802.11 wireless networks. The higher throughput may be realized through several measures, for example parallel transmissions to multiple stations (STAs) at once. In some aspects, a wider channel bandwidth (e.g., 80 MHz or 160 MHz) is used. The IEEE 802.11ac standard may also sometimes be referred to as Very High Throughput (VHT) wireless communications standard.

In the 802.11ac standard, different devices may support different communication data rates, such as high throughput (HT) and very high throughput (VHT). For example, HT communications in the 5 GHz carrier frequency band may allow a range of throughput rates of 500 megabits per second to 1 gigabits per second. For example, VHT communications below the 6 GHz band may allow a throughput of 500 megabits per second to greater than 1 gigabits per second. Further a device, such as a UT 120, may provide to a network device, such as an AP 110, the set of MCS that is supported by the UT 120. Accordingly, the AP 110 knows which MCS will be used for communication with the UT 120.

Certain aspects of the present disclosure support a simplified beamforming reporting mechanism for wireless communications systems. The present disclosure proposes methods and apparatus utilizing a simplified beamforming report that includes one or more phase offsets based on a reference signal.

Transmission of a Beamforming Report

Certain aspects of the present disclosure support transmitting a simplified sounding feedback or beamforming report from a user station (STA) in a wireless Local Area Network (LAN) system. The beamforming report may include one or more phase differences. The one or more phase differences included in the beamforming report may represent phase differences of one or more sounding signals received by the station relative to a reference sounding signal received by the station. In some embodiments, the reference signal is the strongest sounding signal. In these embodiments, the beamforming report may also include an indicator of which signal was the strongest signal. Alternatively, the beamforming report may include a phase difference for every sounding signal received by the station, with the phase difference for the reference signal being set to zero.

In some embodiments, to provide for a beamforming report of reduced size, the phase differences provided in the simplified beamforming report may be limited to one or two bits in length. For example, with a phase difference in the beamforming report of one bit, the phase offset may represent an offset of 0, or an offset of $\pi$. If the phase difference is limited to two bits, the values of the phase difference may represent a phase offset from the set of $\{0, \pi/2, \pi, 3\pi/2\}$. Some other embodiments may be limited to phase differences that are three bits in length. Other embodiments may use phase differences including more than three bits. Phase differences of a larger size may provide finer angle quantization granularity, which may provide improved performance when compared to phase differences limited to fewer bits. In some embodiments, the quantization level of the phase differences may be chosen dynamically or provided by an access point. In an embodiment, quantization levels of one or more phase differences may be selected based on channel conditions by either a station determining the phase differences or by an access point. In an embodiment, the access point transmits a message to a station, the message indicating the quantization level of the phase differences that are to be sent in a simplified beamforming report.

Use of a smaller phase difference quantization may reduce the size of a beamforming codebook. A beamforming codebook may include a set of possible beamforming phase combinations that may be used to adjust one or more signals transmitting data.

If the cookbook size is below a threshold size, a wireless node determining one or more phase differences may determine the phase differences by simulating all combinations of phase differences and determining which combination provides the highest received energy. In an embodiment, the received energy may be determined based on Equation 1 below:

$$\text{received energy} = |h \, v^*|^2 \qquad (1)$$

where:
h=[$h_0$, $h_1$, $h_2$, ... $h_n$],
$h_n$=a channel "n" realization at the receiver,
n=the number of received signals,
v=[1, $e^{j\theta_1}$, $e^{j\theta_2}$, $e^{j\theta_3}$ ... $e^{j\theta_n}$]

In an embodiment, the values of $\theta$ are chosen from a quantized set to maximize the receiver's signal to noise ratio. In some embodiments, this is estimated by using equation (1).

In some embodiments, determining phase differences by simulation may produce results similar to results achieved if the individual phase differences where determined directly and then quantized. In some embodiments, a simulation based approach may reduce computational overhead when compared to determining the phase differences from received signals.

In some embodiments, to provide for a beamforming report of reduced size or to reduce computation or power requirements of the device generating the beamforming report, the beamforming report may only include phase information related to the received signals. For example, no amplitude information may be provided. While some 802.11 standards may provide a beamforming report that includes data needed to support a complete Givens rotation calculation by the transmitter, the simplified beamforming report proposed herein may not include data necessary to support a Givens rotation calculation. Instead, only the phase differences may be provided. In some embodiments, a format type specifier may also be included in the simplified beamforming report. In some embodiments, as discussed above, identification of the reference signal may also be included in the simplified beamforming report.

The beamforming report may also comprise an indicator of the format of the sounding feedback included in the report. For example, some standards, such as the 802.11 ac standard, may define sounding feedback or a beamforming report in a different format than the simplified format proposed herein. For example, the 802.11 ac standard may include Givens rotation angles and other beamforming related information (for example, Signal to Interference plus Noise Ratios (SINRs) for each channel). By providing an indicator that a beamforming report is of a simplified format, receivers of the report may be able to more easily parse and interpret the report contents.

Figure 4:
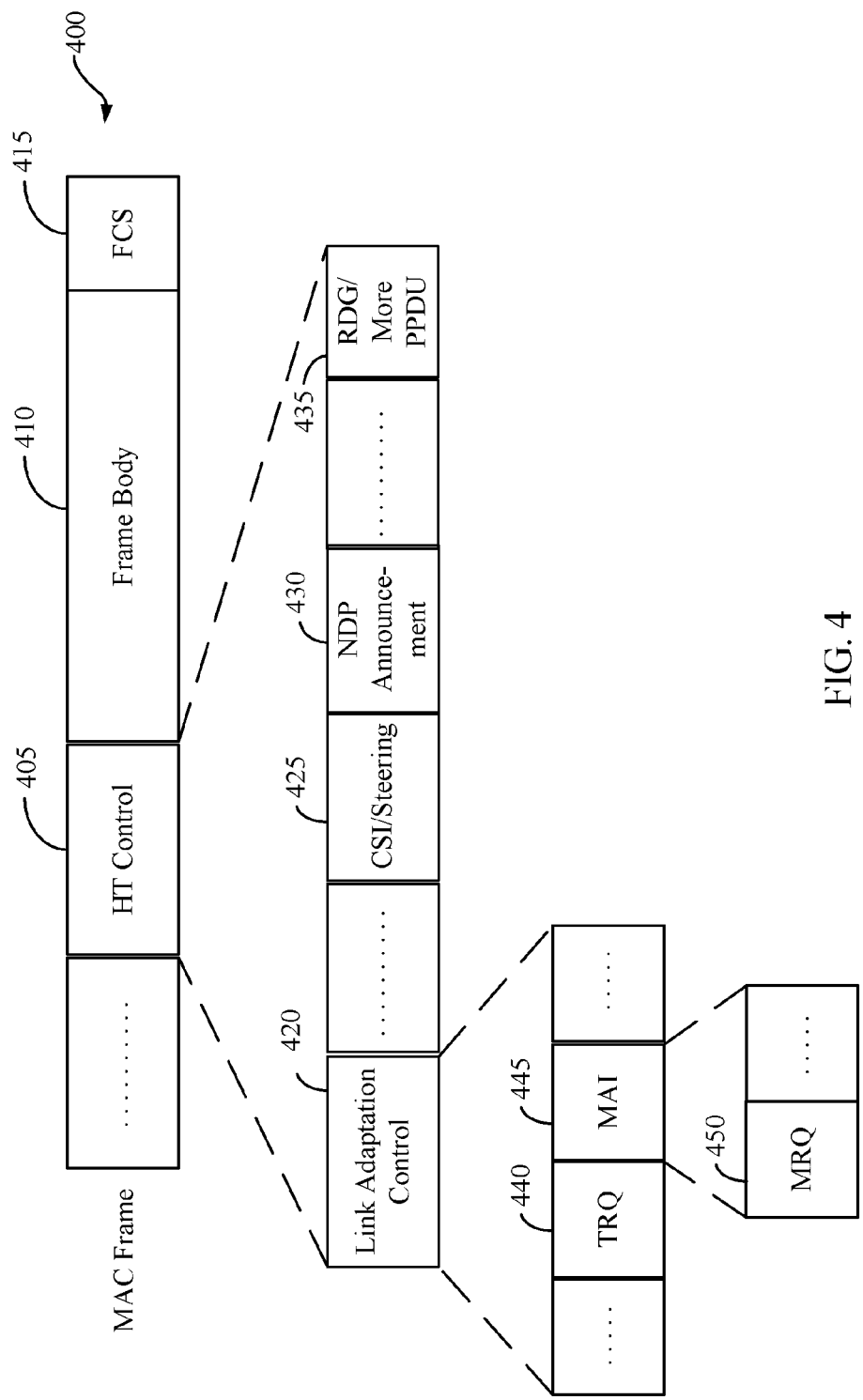
FIG. 4 shows one embodiment of a media access control (MAC) frame.

FIG. 4 shows one embodiment of a media access control (MAC) frame 400. MAC frame 400 includes an HT control field 405, a frame body field 410, and a FCS field 415. The frame body field 410 carries data for the MAC frame 400. The FCS field 415 carries an FCS value, generated based on the contents of other fields in the MAC frame and used for error detection of the MAC frame. The HT Control field 405 includes a plurality of fields including a Link Adaptation Control field 420, a CSI/Steering field 425, an NDP Announcement field 430, and a reverse direction grant (RDG/More PPDU) field 435. The Link Adaption Control field 420 includes a training request (TRQ) field 440 and an MCS request or Antenna Selection Indication (MAI) field 445. The MAI field 445 includes a modulation coding scheme (MCS) request (MRQ) field 450.

In an embodiment, the CSI/Steering field 425 includes two bits and may represent the type of sounding feedback requested by the sender of the MAC frame 400. For example, in an embodiment, the CSI/Steering field 425 may indicate that no sounding feedback is requested, feedback is requested, or a special format of sounding feedback is requested. For example, in an embodiment, a value indicated by the CSI/Steering field 425 may indicate that a compressed beamforming feedback report is requested.

Figure 5:
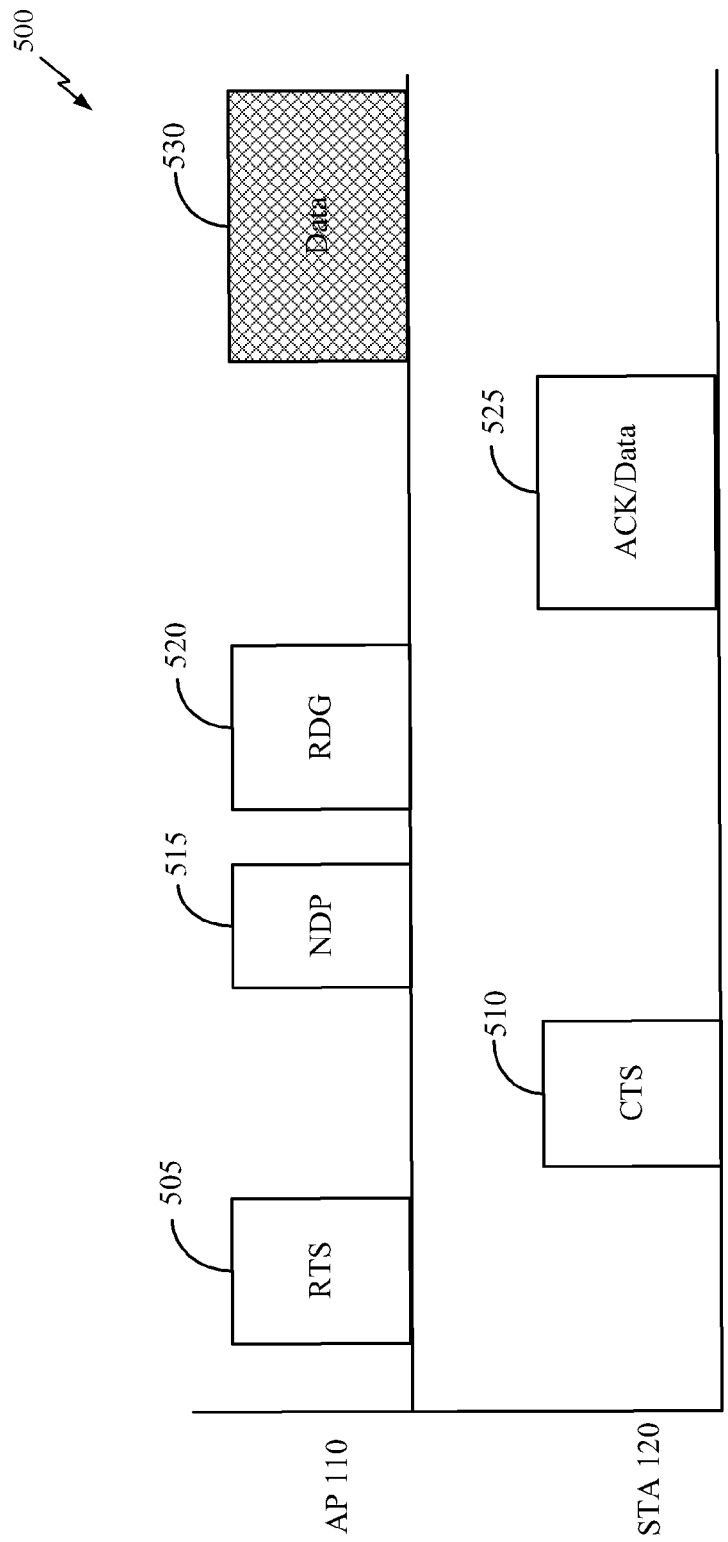
FIG. 5 shows an example frame exchange including NDP sounding and a beamforming report.

FIG. 5 shows an example frame exchange including NDP sounding and a beamforming report. The AP 110 may transmit a frame 505 to the station 120. The frame 505 may include a CSI/steering field 425 as described with reference to FIG. 4. The CSI steering field 425 may specify a type of beamforming report requested. Frame 505 may be a request-to-send (RTS) frame containing a requested duration for the amount of time needed to transmit pending data and associated signaling. Frame 505 may have the NDP Announcement field 430 set to one to indicate that an NDP will follow. Station 120 may receive the RTS frame 505, grant the beamforming request, and transmit a clear to send (CTS) frame 510, which may carry any data that STA 120 may have for the AP 110. The RTS and CTS frames are control frames that may be exchanged to reserve the wireless medium and avoid interference from hidden stations. The RTS and CTS frames may also be omitted.

AP 110 may send a null data packet (NDP) 515 and another frame 520. The NDP frame 515 may be sent within a short interframe space (SIFS) from of the end of frame 510. Frame 520 may have the RDG field 435 set to one to indicate a reverse direction grant, which may transfer control of the wireless medium to STA 120. STA 120 may estimate at least one phase difference between at least two signals received when AP 110 transmitted the NDP frame 515 to STA 120. STA 120 may then generate a simplified beamforming report that includes at least one phase difference. STA 120 may then transmit frame 525 that includes the simplified beamforming report including the phase difference. AP 110 may receive the simplified beamforming report included in frame 525 and transmit a beamformed frame 530 to the STA 120 based on the phase difference included in the beamforming report included in ACK/Data frame 525.

In an embodiment, the RTS 505 and CTS 510 frames may be omitted and replaced with frames of other types. In an embodiment, NDP frame 515 may be sent within SIFS time after frame 520, which may have the NDP Announcement field set to one to indicate that an NDP will follow.

Figure 6A:
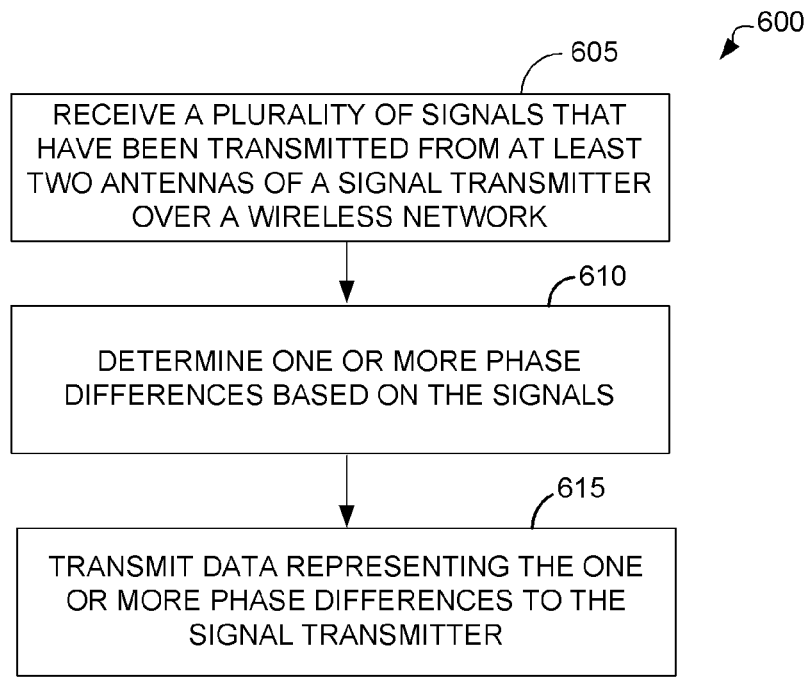
FIG. 6A shows a flow chart of an aspect of an exemplary method for providing simplified beamforming data.

FIG. 6A shows a flow chart of an aspect of an exemplary method for providing simplified beamforming data. The beamforming data may be generated at either an AP or a STA and transmitted to another device in the wireless network. Although the method 600 is described below with respect to elements of the wireless device 302 (FIG. 3), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 605 receives a plurality of signals that have been transmitted from at least two antenna of a signal transmitter over a wireless network. In an embodiment, only one receive antenna is used to receive the plurality of signals. In an embodiment, a plurality of receive antennas are used to receive the plurality of signals. In an embodiment, the signal transmitter is an access point and a station is performing process 600. In an embodiment, the signal transmitter uses four transmit antennas to transmit four signals. In an embodiment, the plurality of signals is four signals. However, the plurality of signals may include two or more signals. In block 610, one or more phase differences are determined based on the signals. In an embodiment, the one or more phase differences represent a phase difference between a first and second signal in the plurality of signals. In an embodiment, either the first or second signal is a reference signal. In an embodiment, the reference signal may be the strongest of the plurality of signals received in block 605.

In an embodiment, method 600 also includes determining a second phase difference based on the plurality of signals. The second phase difference is a phase difference between a third signal and either the first or second signal. In an embodiment, the second phase difference represents a phase difference between the third signal and the reference signal. In an embodiment, process 600 further includes the determination of a third phase difference between a fourth signal in the plurality of signals. In an embodiment, the third phase difference represents a phase difference between the fourth signal and the reference signal. In an embodiment, the first signal, second signal, third signal, and fourth signal are different signals.

In some embodiments, to provide for a beamforming report of reduced size, the determined phase differences may be limited to one or two bits in length. For example, with a phase difference in the beamforming report of one bit, the phase offset may represent an offset of 0, or an offset of $\pi$. If the phase difference is limited to two bits, the values of the phase difference may represent a phase offset from the set of $\{0, \pi/2, \pi, 3\pi/2\}$. Some other embodiments may be limited to phase differences that are three bits in length. Other embodiments may use phase differences including more than three bits. Phase differences of a larger size may provide finer angle quantization granularity, which may provide improved performance when compared to phase differences limited to fewer bits. In some embodiments, the quantization level of the phase differences may be chosen dynamically or received from an access point. In an embodiment, quantization levels of one or more phase differences may be selected based on channel conditions by either a station determining the phase differences or by an access point. In an embodiment, the access point transmits a message to a station, the message indicating the quantization level of the phase differences determined in block 810.

Use of a smaller phase difference quantization may reduce the size of a beamforming codebook. A beamforming codebook may include a set of possible beamforming phase combinations that may be used to adjust one or more signals transmitting data.

If the codebook size is below a threshold size, a wireless node determining one or more phase differences, for example, as performed in block 610, may determine the phase differences by simulating all combinations of phase differences and determining which combination provides the highest received energy or maximizes the signal to noise ratio at a receiver. In an embodiment, the received energy may be determined based on Equation 1 below:

$$\text{received energy} = |h \, v^*|^2 \quad (1)$$

where:
$h=[h_0, h_1, h_2, \ldots h_n]$,
$h_n$=a channel "n" realization at the receiver,
n=the number of received signals,
$v=[1, e^{j\theta_1}, e^{j\theta_2}, e^{j\theta_3} \ldots e^{j\theta_n}]$ In an embodiment, the values of θ are chosen from a quantized set to maximize the receiver's signal to noise ratio. In some embodiments, this is estimated by using equation (1).

In some embodiments, determining phase differences by simulation may produce results similar to results achieved if the individual phase differences where determined directly and then quantized. In some embodiments, a simulation based approach may reduce computational overhead when compared to determining the phase differences from received signals.

In some embodiments, to provide for a beamforming report of reduced size or to reduce computation or power requirements of the device generating the beamforming report, the beamforming report may only include phase information related to the received signals. For example, no amplitude information may be provided.

While some 802.11 standards may provide a beamforming report that includes all data needed to support a complete Givens rotation calculation by the transmitter, the simplified beamforming report proposed herein may not include all data (i.e. angles) necessary to support a complete Givens rotation calculation. By providing only the antenna phase differences, a beamformer may bypass the high complexity Givens rotation calculation and directly translate the angles in the feedback report to beamforming weights. However, it should be noted that the Givens rotation calculation may still be performed based on the simplified beamforming report. In some aspects, the missing angles may be treated as "punctured" or effectively set to known constants by a receiver. Either approach may ultimately lead to an equivalent set of beamforming weights.

In some embodiments, a format type specifier may also be included in the simplified beamforming report. In some embodiments, as discussed above, identification of the reference signal may also be included in the simplified beamforming report.

The beamforming report may also comprise an indicator of the format of the sounding feedback included in the report. For example, some standards, such as the 802.11 ac standard, may define sounding feedback or a beamforming report in a different format than the simplified format proposed herein. For example, the 802.11 ac standard may include Givens rotation angles and other beamforming related information (for example, Signal to Interference plus Noise Ratios (SINRs) for each channel). By providing an indicator that a beamforming report is of a simplified format, receivers of the report may be able to more easily parse and interpret the report contents.

In block 615, data representing the one or more phase differences is transmitted to the signal transmitter. In embodiments described above that determine a second phase difference and/or a third phase difference based on the plurality of signals, those phase differences may also be transmitted to the signal transmitter in block 615.

Figure 6B:
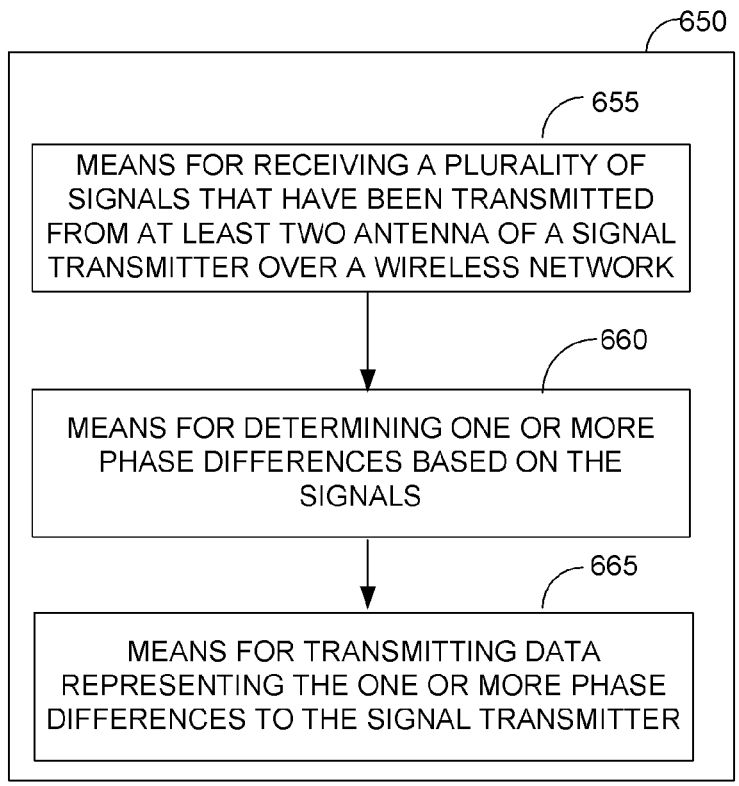
FIG. 6B is a functional block diagram of an exemplary device that may be employed within a wireless communication system.

FIG. 6B is a functional block diagram of an exemplary device 650 that may be employed within the wireless communication system 100. The device 650 includes means 655 for receiving a plurality of signals that have been transmitted from at least two antenna of a signal transmitter over a wireless network. In an embodiment, means 655 may be configured to perform one or more of the functions discussed above with respect to block 605. In an embodiment, the means 655 for receiving a plurality of signals that have been transmitted from at least two antennas of a signal transmitter over a wireless network may include a receiver, such as receiver 312 of FIG. 3. Means 655 may also include one or more of a processor, signal generator, transceiver, decoder, or a combination of hardware and/or software component(s), circuits, and/or module(s).

The device 650 further includes means 660 for determining one or more phase differences based on the signals. In an embodiment, means 660 may be configured to perform one or more of the functions discussed above with respect to block 610. The means 660 for determining one or more phase differences based on the signals may comprises a processor, such as processor 304 of FIG. 3. Means 660 may also include one or more of a processor, signal generator, transceiver, decoder, or a combination of hardware and/or software component(s), circuits, and/or module(s).

The device 650 further includes means 665 for transmitting data representing the one or more phase differences to the signal transmitter. In an embodiment, means 665 may be configured to perform one or more of the functions discussed above with respect to block 615. The means 665 for transmitting data representing the one or more phase differences to the signal generator may comprises a transmitter, such as transmitter 310 of FIG. 3. Means 665 may also include one or more of a processor, signal generator, transceiver, decoder, or a combination of hardware and/or software component(s), circuits, and/or module(s).

Figure 7A:
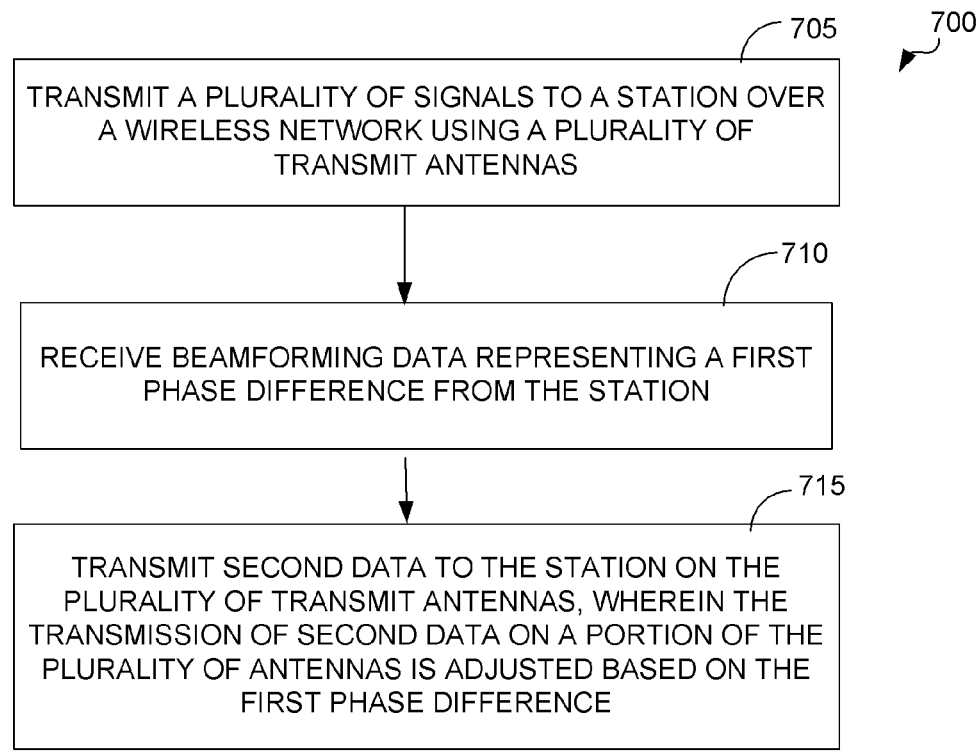
FIG. 7A shows a flow chart of an aspect of an exemplary method for beamforming a wireless transmission.

FIG. 7A shows a flow chart of an aspect of an exemplary method for beamforming a wireless transmission. In some aspects, the wireless transmission includes a plurality of signals generated by a plurality of transmit antennas. In some of these aspects, each signal in the plurality of signals is generated by a different transmission antenna. The wireless transmission may be beamformed by an access point and transmitted to another device in the wireless network. Although the method 700 is described below with respect to elements of the wireless device 302 (FIG. 3), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 705 transmits a plurality of signals to a station over a wireless network using a plurality of transmit antennas. In an embodiment, each of the plurality of signals encodes an identical data stream. In an embodiment, the data stream represents a null data packet, null data packet acknowledgement, or a sounding frame. In an embodiment, there are four signals in the plurality of signals. In an embodiment, there are four transmit antennas used to transmit the plurality of signals in block 705. Some devices performing process 700 will have four transmit antennas.

In block 710, beamforming data representing a first phase difference is received from the station. In an embodiment, the beamforming data includes a plurality of phase differences. For example, the beamforming data may include a second phase difference and/or a third phase difference. In an embodiment, the plurality of phase differences represent phase differences of multiple received signals to a common reference signal. In an embodiment, the number of phase differences received from the station in block 710 is equal to the number of signals in the plurality of signals minus one. In an embodiment, the number of phase differences received from the station in block 710 is equal to the number of transmit antennas the device performing process 700 utilized to transmit the plurality of signals in block 705 minus one.

In an embodiment, the only data received from the station is the phase difference data. For example, in an embodiment, no amplitude related data is received. In an embodiment, the data received from the station does not enable a complete Givens Rotation. In an embodiment, the amount of beamforming data received in block 710 is kept small to reduce complexity imposed on the sender of the beamforming data. For example, the transmitter of the beamforming data received in block 710 may be a low power or low cost station with reduced hardware capability or battery power. By simplifying the beamforming information provided, the ability of a station generating the beamforming information to conserve power and operate with lower cost hardware may be improved.

In some aspects, a beamforming report is received that includes the received beamforming data. In some embodiments, the beamforming report also identifies a reference signal used to determine phase differences included in the beamforming report.

The beamforming report may also comprise an indicator of the format of beamforming or sounding feedback included in the report. For example, some standards, such as the 802.11 ac standard, may define sounding feedback or a beamforming report in a different format than the simplified format proposed herein. For example, the 802.11 ac standard may include Givens rotation angles and other beamforming related information (for example, Signal to Interference plus Noise Ratios (SINRs) for each channel). By receiving an indicator that a beamforming report is of a simplified format, receivers of the report may be able to more easily parse and interpret the report contents.

A received simplified beamforming report proposed herein may not include all data (i.e. angles) necessary to support a complete Givens rotation calculation. If the simplified beamforming report only includes antenna phase differences, a device creating the beamforming report can bypass the high complexity Givens rotation calculation and directly translate the angles in the feedback report to beamforming weights. It should be noted that the Givens rotation calculation may still be performed by process 700 in some aspects based on the simplified beamforming report. In some aspects, the missing angles may be treated as "punctured" or effectively set to known constants by a receiver. Either approach may ultimately lead to an equivalent set of beamforming weights.

In block 715, second data is transmitted to the station on the plurality of transmit antennas. The transmission of second data on a portion of the plurality of transmit antennas is adjusted based on the phase difference. In an embodiment, a reference signal may transmit second data to the station, and may not be adjusted based on the phase difference. In an embodiment, a first signal transmitting second data is adjusted based on the first phase difference. For example, the first signal may be adjusted such that its phase difference relative to the reference signal is substantially negative the first phase difference at a transmit antenna.

A second signal transmitting second data may be adjusted such that its phase difference relative to the reference signal is substantially negative a second phase difference received from the station as beamforming data in block 710. A third signal transmitting second data may be adjusted such that its phase difference relative to the reference signal is substantially negative a third phase difference received from the station as beamforming data in block 710.

In an embodiment, no other adjustments are made to any of the plurality of signals transmitting second data in block 715 based on beamforming data received from the station.

Figure 7B:
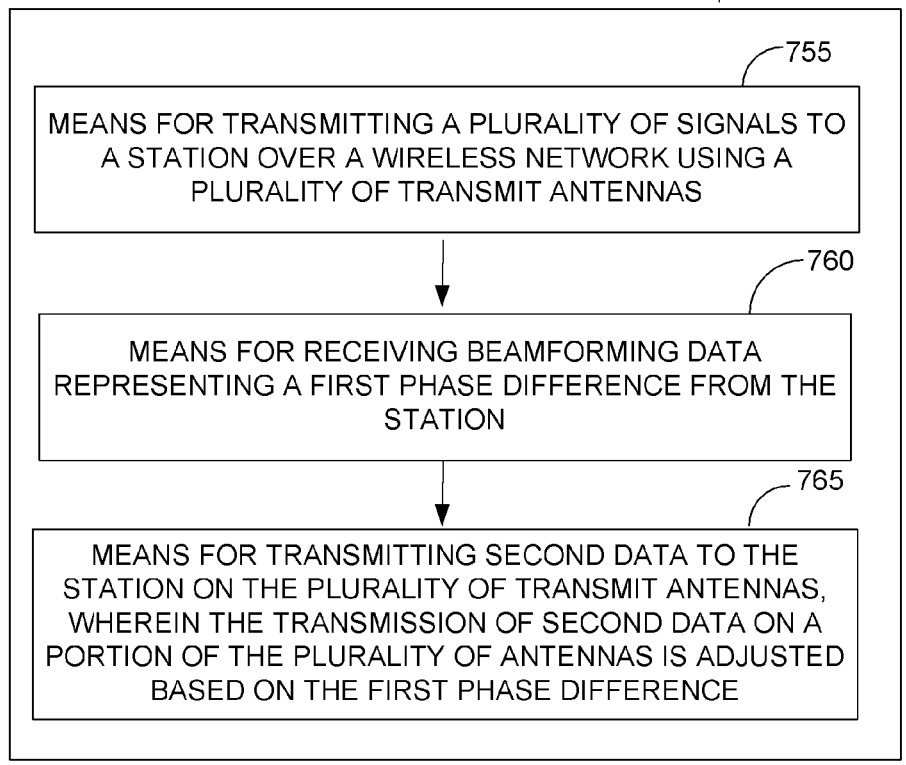
FIG. 7B is a functional block diagram of an exemplary device that may be employed within a wireless communication system.

FIG. 7B is a functional block diagram of an exemplary device 750 that may be employed within the wireless communication system 100. The device 750 includes means 755 for transmitting a plurality of signals to a station over a wireless network using a plurality of transmit antennas. In an embodiment, means 755 may be configured to perform one or more of the functions discussed above with respect to block 705. In an embodiment, the means 755 for transmitting a plurality of signals to a station over a wireless network using a plurality of transmit antennas may include a transmitter, such as transmitter 310 of FIG. 3. Means 755 may also include one or more of a processor, signal generator, transceiver, decoder, or a combination of hardware and/or software component(s), circuits, and/or module(s).

The device 750 further includes means 760 for receiving beamforming data representing a phase difference from the station. In an embodiment, means 760 may be configured to perform one or more of the functions discussed above with respect to block 710. The means 760 for receiving beamforming data representing a phase difference from the station may comprise a receiver, such as receiver 312 of FIG. 3. Means 760 may also include one or more of a processor, signal generator, transceiver, decoder, or a combination of hardware and/or software component(s), circuits, and/or module(s).

The device 750 further includes means 765 for transmitting second data to the station on the plurality of transmit antennas, wherein the transmission of second data on a portion of the plurality of antennas is adjusted based on the phase difference. In an embodiment, means 765 may be configured to perform one or more of the functions discussed above with respect to block 715. The means 765 for transmitting second data to the station on the plurality of transmit antennas, wherein the transmission of second data on a portion of the plurality of antennas is adjusted based on the phase difference may comprises a transmitter, such as transmitter 310 of FIG. 3. Means 765 may also include one or more of a processor, signal generator, transceiver, decoder, or a combination of hardware and/or software component(s), circuits, and/or module(s).

Figure 8A:
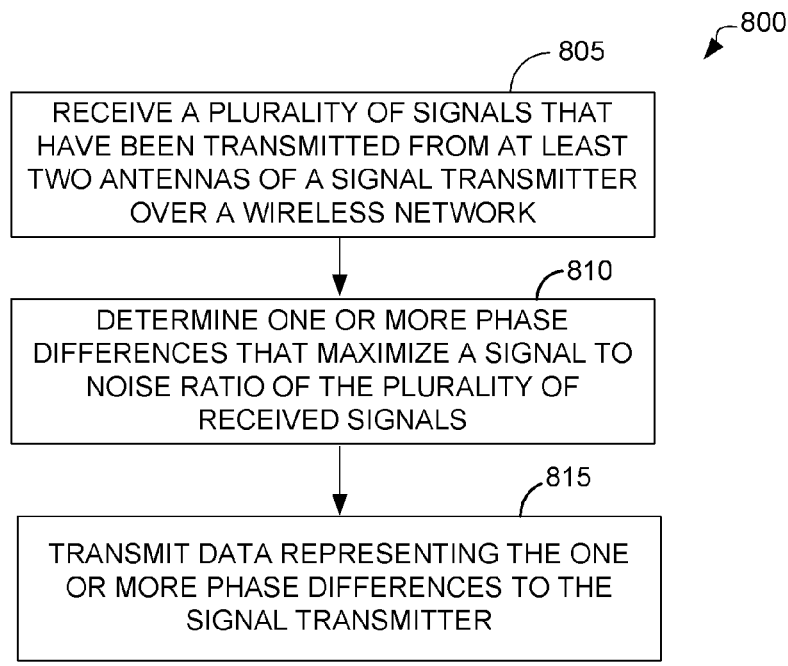
FIG. 8A shows a flow chart of an aspect of an exemplary method for providing simplified beamforming data.

FIG. 8A shows a flow chart of an aspect of an exemplary method for providing simplified beamforming data. The beamforming data may be generated at either an AP or a STA and transmitted to another device in the wireless network. Although the method 800 is described below with respect to elements of the wireless device 302 (FIG. 3), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 805 receives a plurality of signals that have been transmitted from at least two antenna of a signal transmitter over a wireless network. In an embodiment, only one receive antenna is used to receive the plurality of signals. In an embodiment, a plurality of receive antennas are used to receive the plurality of signals. In an embodiment, the signal transmitter is an access point and a station is performing process 800. In an embodiment, the signal transmitter uses four transmit antennas to transmit four signals. In an embodiment, the plurality of signals is four signals. However, the plurality of signals may include two or more signals.

In block 810, one or more phase differences that maximize a signal to noise ratio of the plurality of received signals are determined. Block 810 may determine the phase differences by simulating all combinations of phase differences and determining which combination provides the highest received energy or maximizes the signal to noise ratio at a receiver. In an embodiment, the received energy may be determined based on Equation 2 below:

$$\text{received energy} = |h\, v^*|^2 \qquad (2)$$

where:
$h = [h_0, h_1, h_2, \ldots h_n]$,
$h_n =$ a channel "n" realization at the receiver,
n = the number of received signals,
$v = [1, e^{j\theta_1}, e^{j\theta_2}, e^{j\theta_3} \ldots e^{j\theta_n}]$ In an embodiment, the values of $\theta$ are chosen from a quantized set to maximize the receiver's signal to noise ratio. In some embodiments, this is estimated by using equation (2). In some embodiments, determining phase differences by simulation may produce results similar to results achieved if the individual phase differences where determined directly and then quantized. In some embodiments, a simulation based approach may reduce computational overhead when compared to determining the phase differences from received signals.

In an embodiment, the one or more phase differences represent a phase difference between a first and second signal in the plurality of signals. In an embodiment, either the first or second signal is a reference signal. In an embodiment, the reference signal may be the strongest of the plurality of signals received in block 805.

In an embodiment, method 800 also includes determining a second phase difference based on the plurality of signals. The second phase difference is a phase difference between a third signal and either the first or second signal. In an embodiment, the second phase difference represents a phase difference between the third signal and the reference signal. In an embodiment, process 800 further includes the determination of a third phase difference between a fourth signal in the plurality of signals. In an embodiment, the third phase difference represents a phase difference between the fourth signal and the reference signal. In an embodiment, the first signal, second signal, third signal, and fourth signal are different signals. In some aspects, one or more of the first, second, and third phase differences discussed above may be determined using equation (2) above.

In some embodiments, to provide for a beamforming report of reduced size, the determined phase differences may be limited to one or two bits in length. For example, with a phase difference in the beamforming report of one bit, the phase offset may represent an offset of 0, or an offset of $\pi$. If the phase difference is limited to two bits, the values of the phase difference may represent a phase offset from the set of $\{0, \pi/2, \pi, 3\pi/2\}$. Some other embodiments may be limited to phase differences that are three bits in length. Other embodiments may use phase differences including more than three bits. Phase differences of a larger size may provide finer angle quantization granularity, which may provide improved performance when compared to phase differences limited to fewer bits. In some embodiments, the quantization level of the phase differences may be chosen dynamically or received from an access point. In an embodiment, quantization levels of one or more phase differences may be selected based on channel conditions by either a station determining the phase differences or by an access point. In an embodiment, the access point transmits a message to a station, the message indicating the quantization level of the phase differences determined in block 810.

Use of a smaller phase difference quantization may reduce the size of a beamforming codebook. A beamforming codebook may include a set of possible beamforming phase combinations that may be used to adjust one or more signals transmitting data.

In some embodiments, to provide for a beamforming report of reduced size or to reduce computation or power requirements of the device generating the beamforming report, the beamforming report may only include phase information related to the received signals. For example, no amplitude information may be provided.

While some 802.11 standards may provide a beamforming report that includes all data needed to support a complete Givens rotation calculation by the transmitter, the simplified beamforming report proposed herein may not include all data (i.e. angles) necessary to support a complete Givens rotation calculation. By providing only the antenna phase differences, a beamformer can bypass the high complexity Givens rotation calculation and directly translate the angles in the feedback report to beamforming weights. However, it should be noted that the Givens rotation calculation may still be performed based on the simplified beamforming report. In some aspects, the missing angles may be treated as "punctured" or effectively set to known constants by a receiver. Either approach may ultimately lead to an equivalent set of beamforming weights.

In some embodiments, a format type specifier may also be included in the simplified beamforming report. In some embodiments, as discussed above, identification of the reference signal may also be included in the simplified beamforming report.

The beamforming report may also comprise an indicator of the format of the sounding feedback included in the report. For example, some standards, such as the 802.11 ac standard, may define sounding feedback or a beamforming report in a different format than the simplified format proposed herein. For example, the 802.11 ac standard may include Givens rotation angles and other beamforming related information (for example, Signal to Interference plus Noise Ratios (SINRs) for each channel). By providing an indicator that a beamforming report is of a simplified format, receivers of the report may be able to more easily parse and interpret the report contents.

In block 815, data representing the one or more phase differences is transmitted to the signal transmitter. In embodiments described above that determine a second phase difference and/or a third phase difference based on the plurality of signals, those phase differences may also be transmitted to the signal transmitter in block 815.

Figure 8B:
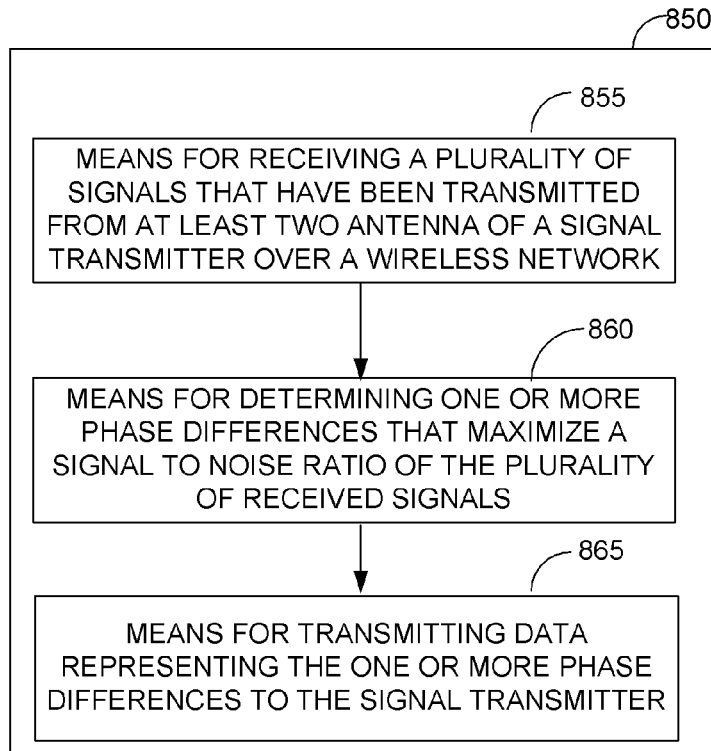
FIG. 8B is a functional block diagram of an exemplary device that may be employed within a wireless communication system.

FIG. 8B is a functional block diagram of an exemplary device 850 that may be employed within the wireless communication system 100. The device 850 includes means 855 for receiving a plurality of signals that have been transmitted from at least two antenna of a signal transmitter over a wireless network. In an embodiment, means 855 may be configured to perform one or more of the functions discussed above with respect to block 805. In an embodiment, the means 855 for receiving a plurality of signals that have been transmitted from at least two antennas of a signal transmitter over a wireless network may include a receiver, such as receiver 312 of FIG. 3. Means 855 may also include one or more of a processor, signal generator, transceiver, decoder, or a combination of hardware and/or software component(s), circuits, and/or module(s).

The device 850 further includes means 860 for determining one or more phase differences that maximize a signal to noise ratio of the plurality of received signals. In an embodiment, means 860 may be configured to perform one or more of the functions discussed above with respect to block 810. The means 860 for determining one or more phase differences that maximize a signal to noise ratio may comprises a processor, such as processor 304 of FIG. 3. Means 860 may also include one or more of a processor, signal generator, transceiver, decoder, or a combination of hardware and/or software component(s), circuits, and/or module(s).

The device 850 further includes means 865 for transmitting data representing the one or more phase differences to the signal transmitter. In an embodiment, means 865 may be configured to perform one or more of the functions discussed above with respect to block 815. The means 865 for transmitting data representing the one or more phase differences to the signal generator may comprises a transmitter, such as transmitter 310 of FIG. 3. Means 865 may also include one or more of a processor, signal generator, transceiver, decoder, or a combination of hardware and/or software component(s), circuits, and/or module(s).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of providing simplified beamforming data to a signal transmitter, comprising:
   receiving, by a first wireless device, a plurality of signals that have been transmitted from at least two antennas of the signal transmitter over a wireless communication network;
   determining, by the first wireless device, one or more phase differences that maximize a signal to noise ratio of the plurality of received signals;
   generating, by the first wireless device, a beamforming report comprising sounding feedback relating to differences between the received plurality of signals, and an indicator of a format of the sounding feedback, the sounding feedback also representing at least the one or more phase differences;
   transmitting, by the first wireless device, the beamforming report to the signal transmitter.

2. The method of claim 1, wherein each of the phase differences are selected from zero (0) and $\pi$.

3. The method of claim 1, wherein each of the phase differences are selected from zero (0), $\pi/2$, $\pi$, and $3\pi/2$.

4. The method of claim 1, further comprising generating the beamforming report to indicate a simplified beamforming report.

5. The method of claim 4, wherein the simplified beamforming report does not include amplitude information.

6. The method of claim 5, wherein the simplified beamforming report includes only phase difference information.

7. The method of claim 1, wherein the plurality of signals are received on one receive antenna.

8. The method of claim 1, wherein the signal transmitter is an access point.

9. An apparatus for providing simplified beamforming data to a signal transmitter, comprising:
   a receiver configured to receive a plurality of signals transmitted from at least two antennas of the signal transmitter over a wireless communication network;
   a processor configured to:
     determine one or more phase differences that maximize a signal to noise ratio of the plurality of received signals, and
     generate a beamforming report comprising sounding feedback relating to differences between the received plurality of signals, and an indicator of a format of the sounding feedback, the sounding feedback also representing at least the one or more phase differences; and
   a transmitter configured to transmit the beamforming report to the signal transmitter.

10. The apparatus of claim 9, wherein the processor is further configured to select each of the phase differences from zero (0) and $\pi$.

11. The apparatus of claim 9, wherein the processor is further configured to select each of the phase differences from zero (0), $\pi/2$, $\pi$, and $3\pi/2$.

12. The apparatus of claim 9, wherein the beamforming report indicates a simplified beamforming report.

13. The apparatus of claim 12, wherein the transmitter is configured to transmit a simplified beamforming report that does not include amplitude information.

14. The apparatus of claim 13, wherein the transmitter is configured to transmit a simplified beamforming report that includes only phase difference information.

15. An apparatus for providing simplified beamforming data to a signal transmitter, comprising:
   means for receiving a plurality of signals that have been transmitted from at least two antennas of a signal transmitter over a wireless network;
   means for determining one or more phase differences that maximize a signal to noise ratio of the plurality of received signals;
   means for generating a beamforming report comprising sounding feedback relating to differences between the received plurality of signals, and an indicator of a format of the sounding feedback, the sounding feedback also representing at least the one or more phase differences; and
   means for transmitting the beamforming report to the signal transmitter.

16. The apparatus of claim 15, wherein the means for determining is configured to select each of the phase differences from zero (0) and $\pi$.

17. The apparatus of claim 15, wherein the means for determining is configured to select each of the phase differences from zero (0), $\pi/2$, $\pi$, and $3\pi/2$.

18. The apparatus of claim 15, wherein the beamforming report indicates a simplified beamforming report.

19. The apparatus of claim 18, wherein the means for transmitting is configured to transmit a simplified beamforming report that does not include amplitude information.

20. The apparatus of claim 18, wherein the means for transmitting is configured to transmit a simplified beamforming report that includes only phase difference information.

21. A non-transitory computer readable medium comprising instructions that when executed cause a processor to perform a method of:
- receiving a plurality of signals that have been transmitted from at least two antennas of a signal transmitter over a wireless network;
- determining one or more phase differences that maximize a signal to noise ratio of the plurality of received signals;
- generating a beamforming report comprising sounding feedback relating to differences between the received plurality of signals, and an indicator of a format of the sounding feedback, the sounding feedback also representing at least the one or more phase differences; and
- transmitting the beamforming report to the signal transmitter.

22. The non-transitory computer readable medium of claim 21, wherein each of the phase differences are selected from zero (0) and $\pi$.

23. The non-transitory computer readable medium of claim 21, wherein each of the phase differences are selected from zero (0), $\pi/2$, $\pi$, and $3\pi/2$.

24. The non-transitory computer readable medium of claim 21, wherein the beamforming report indicates a simplified beamforming report.

25. The non-transitory computer readable medium of claim 24, wherein the simplified beamforming report does not include amplitude information.

26. The non-transitory computer readable medium of claim 24, wherein the simplified beamforming report includes only phase difference information.

27. An apparatus for wireless communication, comprising:
- a transmitter configured to transmit a plurality of signals to a wireless device;
- a receiver configured to receive a beamforming report from the wireless device;
- a processor configured to:
  - decode the beamforming report to determine a format of sounding feedback included in the report, the sounding feedback representing differences between the plurality of signals when received by the wireless device;
  - decode a first set of information from the beamforming report in response to determining the format of the sounding feedback is a first type;
  - decode a second set of information different from the first set of information from the beamforming report in response to determining the format of the sounding feedback is a second type, and
- a transmitter configured to transmit a signal to the wireless device based on the decoded information.

28. The apparatus of claim 27, further comprising:
- decoding, from the beamforming report, phase offset information that maximizes a signal to noise ratio of the transmitted plurality of signals when received at the wireless device in response to determining the format of the sounding feedback is a first type; and
- decoding givens rotation angles from the beamforming report in response to determining the format of the sounding feedback is a second type.

* * * * *